(12) United States Patent
Lau et al.

(10) Patent No.: US 9,543,798 B2
(45) Date of Patent: Jan. 10, 2017

(54) ELECTRIC MOTOR

(71) Applicant: Johnson Electric S.A., Murten (CH)

(72) Inventors: James Ching-Sik Lau, Hong Kong (CN); Chun Kit Cheung, Hong Kong (CN); Duncan Yiu Lung Wong, Hong Kong (CN); Xiao Jun Yang, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 285 days.

(21) Appl. No.: 14/211,986

(22) Filed: Mar. 14, 2014

(65) Prior Publication Data
US 2014/0300238 A1    Oct. 9, 2014

(30) Foreign Application Priority Data

Apr. 3, 2013  (CN) .......................... 2013 1 0115601

(51) Int. Cl.
*H02K 3/28* (2006.01)
*H02K 15/16* (2006.01)

(52) U.S. Cl.
CPC .............. *H02K 3/28* (2013.01); *H02K 15/165* (2013.01)

(58) Field of Classification Search
CPC ................................ H02K 3/28; H02K 15/165
USPC ........................................ 310/208, 202, 201
See application file for complete search history.

(56) References Cited

U.S. PATENT DOCUMENTS

| | | | |
|---|---|---|---|
| 7,211,918 B2 | 5/2007 | Migita et al. | |
| 7,373,711 B2 | 5/2008 | Migita et al. | |
| 7,619,344 B2 | 11/2009 | Osawa et al. | |
| 2005/0073281 A1* | 4/2005 | Kerlin, IV | H02K 57/006 318/749 |
| 2006/0220489 A1* | 10/2006 | Osawa | H02K 23/28 310/198 |
| 2009/0179519 A1* | 7/2009 | Poon | H01R 43/08 310/237 |
| 2012/0126539 A1* | 5/2012 | Jacob | F01D 15/10 290/52 |

FOREIGN PATENT DOCUMENTS

JP    62-185527 A    8/1987

* cited by examiner

*Primary Examiner* — Terrance Kenerly
(74) *Attorney, Agent, or Firm* — Muncy, Geissler, Olds & Lowe, P.C.

(57) ABSTRACT

A rotor for an electric motor has an iron core and a winding wound about teeth of the rotor core. Slots are formed between the teeth to accommodate coils of the winding. The winding includes several layers of windings distributed in the radial direction of the rotor. Each winding layer has a plurality of coils with the coils of each winding layer being wound on the teeth in the circumferential direction of the rotor. The overall center of gravity of the winding layers is substantially positioned at the geometric center of the rotor. Thus the center of gravity of the entire winding is located substantially at the geometric center of the rotor, thereby preventing noise caused by unstable rotation due to the deviation between the center of gravity of the winding and the geometric center of the rotor.

19 Claims, 4 Drawing Sheets

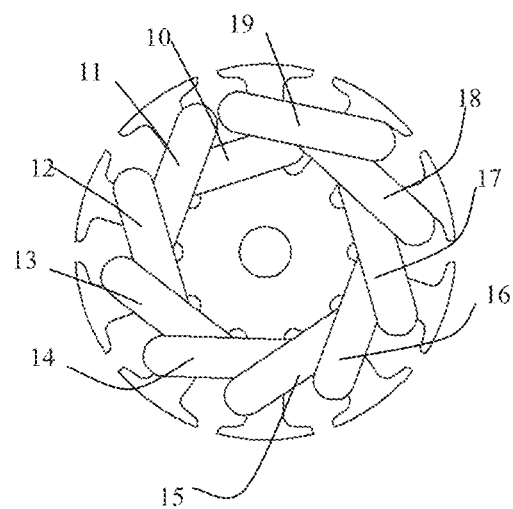 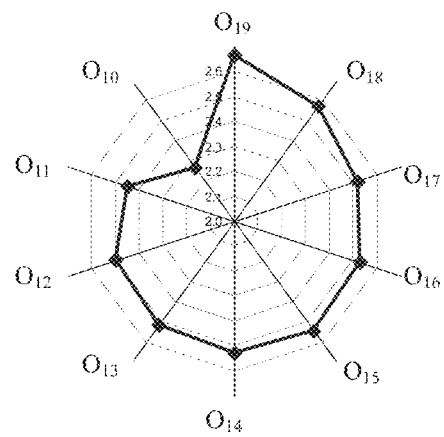
FIG. 1  FIG. 2
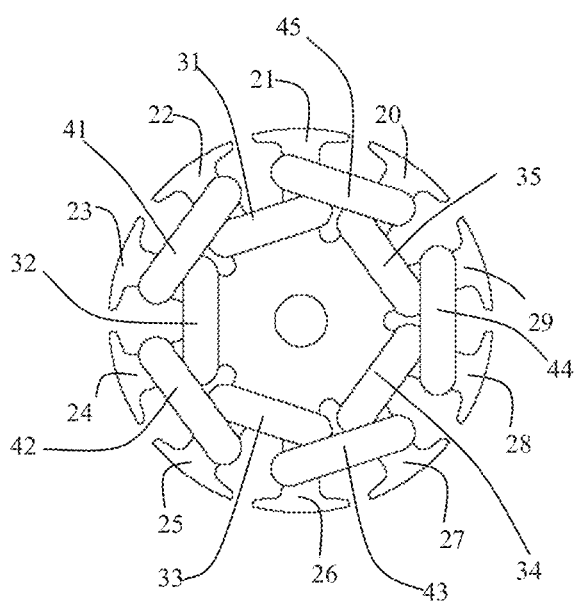 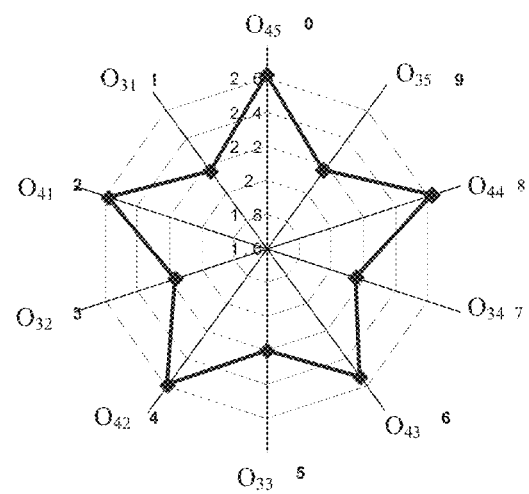
FIG. 3  FIG. 4

ELECTRIC MOTOR

CROSS REFERENCE TO RELATED APPLICATIONS

This non-provisional patent application claims priority under 35 U.S.C. §119(a) from Patent Application No. 201310115601.2 filed in The People's Republic of China on Apr. 3, 2013.

FIELD OF THE INVENTION

This invention relates to an electric motor and in particular, to a rotor for a DC motor.

BACKGROUND OF THE INVENTION

FIG. 1 depicts a rotor of an electric rotor of existing technology. The rotor has ten teeth. Slots are formed between adjacent teeth to accommodate a winding wound about the teeth. The winding comprises a number of coils (10-19) of wire wound about corresponding teeth. Each coil is wound about two of the teeth. The ends of each coil overlap with an end of each adjacent coil. FIG. 2 illustrates a graph of the distribution of the centers of gravity (O10-19) of the coils (10-19) of the rotor. The center of gravity (O10) of the first coil 10 is the nearest to the geometric center of the rotor, whereas the gravity center (O19) of the last coil 19 to be wound is furthest from the geometric center of the rotor, and the gravity center of the winding as a whole is shifted away from the geometric center of the rotor. Using this method of winding, the center of gravity of the winding deviates from the geometric center of the rotor, causing the rotor to be prone to deflection during the rotation and producing noise due to the unbalanced rotation.

Hence there is a desire for an electric DC motor which has a rotor wound with a winding with a center of gravity which is closer to the center of rotation of the rotor.

SUMMARY OF THE INVENTION

This is achieved in the present invention by winding the rotor with a winding having a plurality of winding layers in which coils forming the winding are arranged in a non-overlapping manner.

Accordingly, in one aspect thereof, the present invention provides a rotor of an electric motor, comprising an iron core and a winding wound on the iron core, wherein the iron core comprises several teeth and slots positioned between adjacent teeth, the winding comprises a plurality of winding layers distributed in the radial direction of the rotor, each winding layer comprises a plurality of coils, and the coils in each winding layer are wound about corresponding teeth in the circumferential direction of the rotor; wherein the center of gravity of the entire winding is essentially situated at the geometric center of the rotor.

Preferably, the center of gravity of each winding layer is essentially situated at the geometric center of the rotor.

Preferably, the coils in each winding layer do not overlap in the radial direction of the rotor, and the centers of gravity of the coils in each winding layer are evenly distributed on a concentric circle in the circumferential direction of the rotor.

Preferably, the winding comprises an even number of winding layers; and the coils in each winding layer span an even number of teeth.

Preferably, the winding comprises an inner winding layer and an outer winding layer; and the centers of gravity of two adjacent coils in one winding layer and the center of gravity of the coil in the other winding layer nearest said two adjacent coils, define an isosceles triangle.

Preferably, the inner winding layer and the outer winding layer each comprise five coils and each coil spans two teeth, whereby in the same layer the line connecting the centers gravity of each coil forms a regular pentagon shape.

Alternatively, the winding comprises an odd number of layers and the coils in each winding layer span an odd number of teeth.

Preferably, the winding comprises an inner winding layer, a middle winding layer and an outer winding layer; and each winding layer comprises four coils, and each coil spans three teeth, whereby the line connecting the centers of gravity of each coil in the same winding layer forms a square.

Preferably, the teeth extend in the radial direction of the rotor, and the slots formed between the teeth accommodate the coils of the winding, wherein the size and shape of each slot is substantially the same, and the size and shape of each tooth is substantially the same.

Preferably, the number of teeth of the rotor is equal to the total number of coils.

According to a second aspect, the present invention provides an electric motor comprising a stator and a rotor that rotates with respect to the stator; the stator comprises four alternately arranged permanent magnet magnetic poles; the rotor comprises a commutator, an iron core and a winding wound about the iron core, wherein the commutator comprises ten commutator segments; the iron core comprises ten teeth forming ten slots respectively formed between adjacent teeth to accommodate the winding; the winding comprises at least two winding layers distributed in the radial direction of the rotor; each winding layer comprises a plurality of coils; and the coils in each winding layer are wound about a plurality of corresponding teeth in turn in the circumferential direction of the rotor; both ends of each winding unit being directly connected to two corresponding commutator segments, and the center of gravity of the entire winding is substantially situated at the geometric center of the rotor.

Preferably, the rotor is a rotor as described above.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

FIG. 1 is an end view of a rotor of an electric motor according to existing technology;

FIG. 2 is a graph depicting the distribution of centers of gravity of the winding of the rotor of FIG. 1;

FIG. 3 is an end view of a rotor of an electric motor according to a first embodiment of the present invention;

FIG. 4 is a graph depicting the distribution of centers of gravity of the winding of the rotor of FIG. 3;

DETAILED DESCRIPTION OF THE PREFERRED EMBODIMENTS

Figure 5:
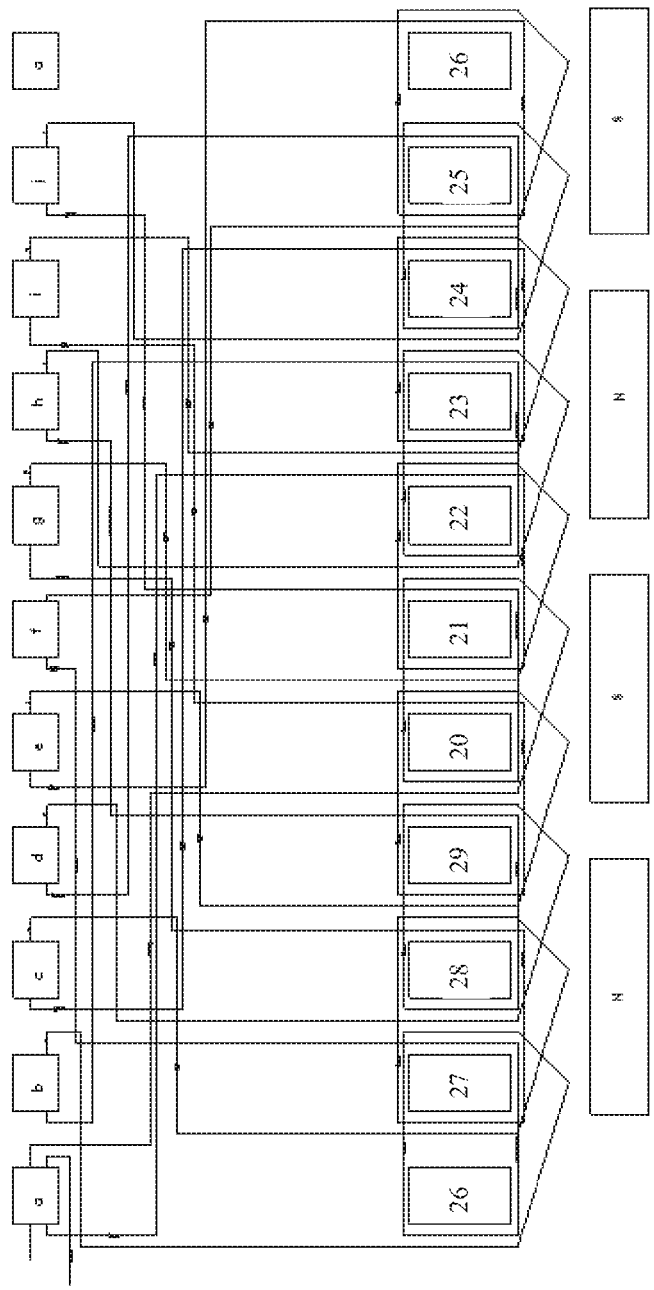
FIG. 5 is a winding diagram for the rotor of FIG. 3.

A rotor for an electric motor, in particular, a permanent magnet brushed direct current (PMDC) motor, according to the preferred embodiment of the present invention, includes a shaft, an iron core fixed to the shaft and a winding wound about the iron core. The iron core includes several teeth and slots formed between the teeth. The winding includes a plurality of layers of coils distributed in the radial direction of the rotor, and each layer includes several coils. The coils of each layer are wound on corresponding teeth in the circumferential direction of the rotor, whereby the center of gravity of the entire winding is positioned substantially at the geometric center of the rotor.

FIG. 3 illustrates an electric motor rotor according to a first preferred embodiment of this invention, including the iron core and the winding. The iron core includes 10 teeth (20-29) and ten slots formed between adjacent teeth for receiving the coils of the winding. Preferably, the teeth (20-29) extend in the radial direction of the rotor. Each slot has substantially the same shape, all of which have an outer portion that is larger than an inner portion. Each tooth is substantially the same in size and shape. The center of gravity of the iron core is substantially positioned at the geometric center of the rotor core, namely the geometric center of the rotor, which also corresponds to the axis of the shaft.

The winding includes an inner winding layer and an outer winding layer, each layer having of 5 coils (31-35, 41-45), and the coils in each winding layer do not overlap one another in the radial direction of the rotor. Each coil is wound about an even number of teeth and in this embodiment each coil is wound about two teeth. Each coil in the outer winding layer shifts one position in the circumferential direction from the adjacent coil of the inner winding layer.

The graph of FIG. 4 shows the distribution of the centers of gravity of the coils in the rotor of FIG. 3. The distances from the centers of gravity (O31-35, O41-45) of each winding layer to the geometric center of the rotor are the same. Namely, the centers of gravity (O31-35) of all coils (31-35) in the inner winding layer are evenly distributed on a concentric circle in the circumferential direction of the rotor whereas the centers of gravity (O42-45) of all coils (41-45) in the outer winding layer are evenly distributed on another concentric circle in the circumferential direction of the rotor. The two circles are concentric with the rotational center or axis of the rotor. The center of gravity of each winding layer is substantially located at the geometric center of the rotor; thus the center of gravity of the entire winding is also located substantial at the geometric center of the rotor. In this embodiment, the line connecting the centers of gravity of two adjacent coils in one winding layer (for example O31 and O32) to the center of gravity of the nearest coil in the other winding layer (for example O41) forms an isosceles triangle. That is, the centers of gravity of the three coils define the points of an isosceles triangle.

FIG. 5 is a winding diagram for a permanent magnet direct current motor incorporating the rotor of FIG. 3. The diagram includes the commutator segments and the magnetic poles of the stator. The motor includes a stator and a rotor rotatable with respect to the stator, wherein the stator includes four alternately arranged permanent magnet poles. The permanent magnet poles are positioned at the periphery of the rotor and oppose the rotor core and the windings. The rotor also includes a commutator and the commutator includes several commutator segments (a-j) for making an electrical connection with the winding. In this invention, all coils (31-35, 41-45) of the winding may be wound by one continuous coil. There are no equalizer wires (a conductor for short-circuiting commutator segments having the same electric potential), and the two ends of each coil are directly connected to the two corresponding commutator segments.

Figure 6:
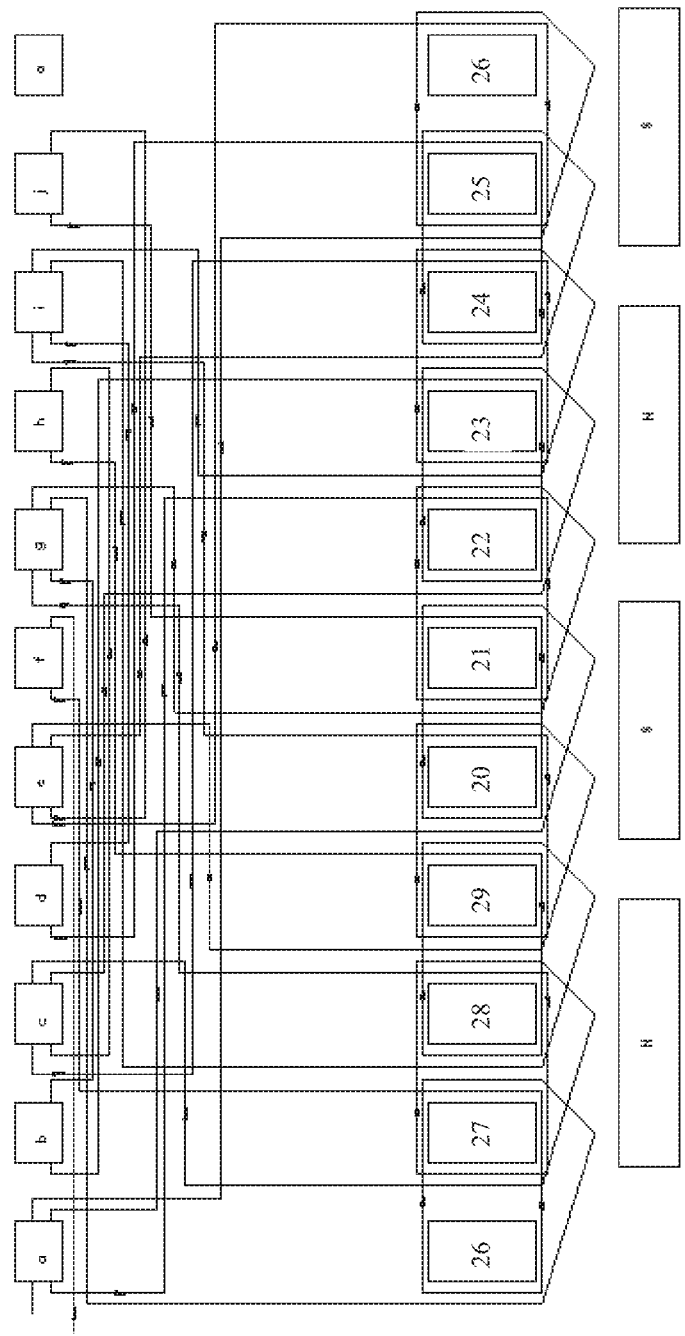
FIG. 6 illustrates an alternative winding diagram for the rotor.

FIG. 6 is a winding diagram illustrating an alternative way for winding the rotor according to the present invention. In this embodiment, in which all coils (31-35, 41-45) are wound by using one wire but there is an equalizer wire between commutator segments of equal electric potential.

Figure 7:
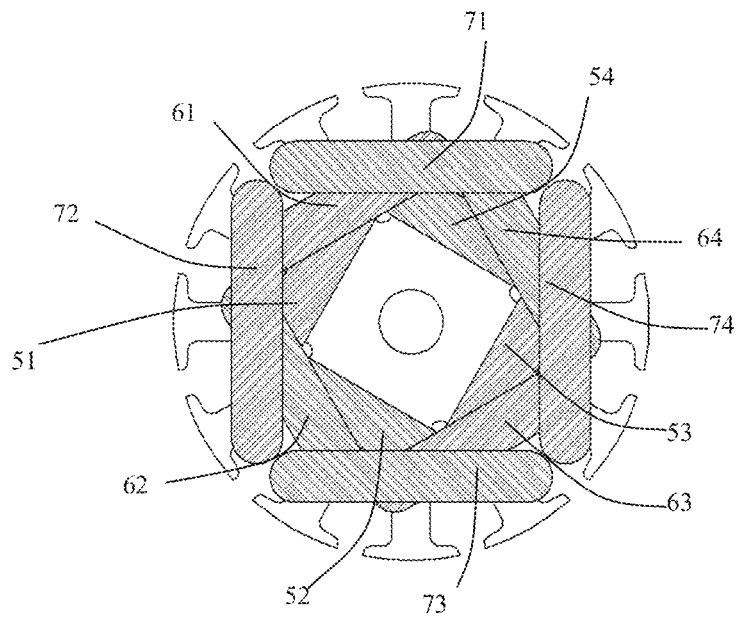
FIG. 7 is an end view of a rotor according to another embodiment of this invention.
Figure 8:
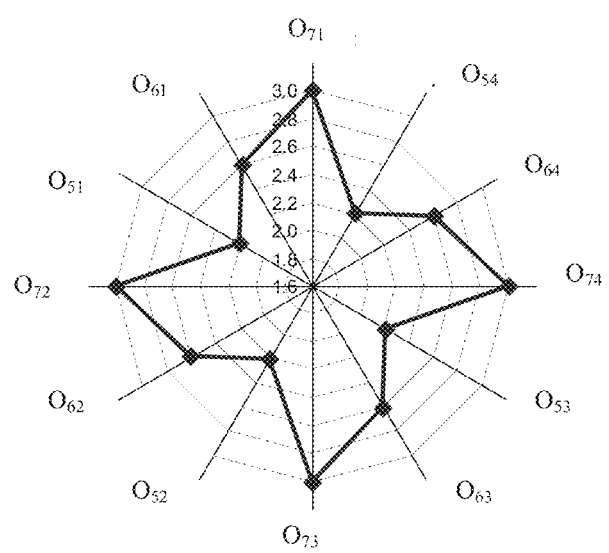
FIG. 8 is a graph depicting the distribution of centers of gravity of the winding of the rotor of FIG. 7.

FIG. 7 is an end view of a rotor according to another embodiment of the present invention. FIG. 8 is a graph showing the distribution of the centers of gravity of the coils of the rotor of FIG. 7. In this embodiment the windings include an inner winding layer, a middle winding layer and an outer winding layer, and the coils in each winding layer are wound about an odd number of teeth. In this embodiment, the rotor core has 12 teeth. Each winding layer has four coils (51-54, 61-64 and 71-74), and each coil is wound about 3 teeth. In the same layer, the line connecting the centers of gravity (O51-54, O51-54 and O51-54) of the coils (51-54, 61-64 and 71-74) forms a square and the center of gravity of each winding layer is substantially located at the geometric center of the rotor.

Although the invention is described with reference to one or more preferred embodiments, it should be appreciated by those skilled in the art that various modifications are possible. Therefore, the scope of the invention is to be determined by reference to the claims that follow.

For example, the iron core may include 16 teeth, the windings may be divided into four layers, and each coil may step across four teeth.

In the description and claims of the present application, each of the verbs "comprise", "include", "contain" and "have", and variations thereof, are used in an inclusive sense, to specify the presence of the stated item but not to exclude the presence of additional items.

The invention claimed is:

1. A rotor of an electric motor, comprising an iron core and a winding wound on the iron core, wherein the iron core comprises a plurality of teeth and slots positioned between adjacent teeth, the winding comprises a plurality of winding layers distributed in the radial direction of the rotor, each winding layer comprises a plurality of coils, and the coils in each winding layer are wound about corresponding teeth in the circumferential direction of the rotor; and wherein the center of gravity of the entire winding is essentially situated at the geometric center of the rotor, wherein the winding comprises an inner winding layer, a middle winding layer and an outer winding layer; and each winding layer comprises four coils, and each coil spans three teeth, whereby the line connecting the centers of gravity of each coil in the same winding layer forms a square.

2. The rotor of claim 1, wherein the center of gravity of each winding layer is essentially situated at the geometric center of the rotor.

3. The rotor of claim 1, wherein the coils in each winding layer do not overlap in the radial direction of the rotor, and the centers of gravity of the coils in each winding layer are evenly distributed on a concentric circle in the circumferential direction of the rotor.

4. The rotor of claim 1, wherein the winding comprises an even number of winding layers; and the coils in each winding layer span an even number of teeth.

5. The rotor of claim 4, wherein the winding comprises an inner winding layer and an outer winding layer; and the centers of gravity of two adjacent coils in one winding layer and the center of gravity of the coil in the other winding layer nearest said two adjacent coils, define an isosceles triangle.

6. The rotor of claim 5, wherein the inner winding layer and the outer winding layer each comprise five coils and each coil spans two teeth, whereby in the same layer the line connecting the centers gravity of each coil forms a regular pentagon shape.

7. The rotor of claim 1, wherein the teeth extend in the radial direction of the rotor, and the slots formed between the teeth accommodate the coils of the winding, wherein the size and shape of each slot is substantially the same, and the size and shape of each tooth is substantially the same.

8. The rotor of claim 1, wherein the number of teeth of the rotor is equal to the total number of coils.

9. An electric motor comprising a stator and a rotor that rotates with respect to the stator; the stator comprises four alternately arranged permanent magnet magnetic poles; the rotor comprises a commutator, an iron core and a winding wound about the iron core, wherein the commutator comprises ten commutator segments; the iron core comprises ten teeth forming ten slots respectively formed between adjacent teeth to accommodate the winding; the winding comprises at least two winding layers distributed in the radial direction of the rotor; each winding layer comprises a plurality of coils; and the coils in each winding layer are wound about a plurality of corresponding teeth in turn in the circumferential direction of the rotor; both ends of each winding unit being directly connected to two corresponding commutator segments, and the center of gravity of the entire winding is substantially situated at the geometric center of the rotor, wherein the number of teeth of the rotor is equal to the total number of coils.

10. The motor of claim 9, wherein the center of gravity of each winding layer is essentially situated at the geometric center of the rotor.

11. The motor of claim 9, wherein the coils in each winding layer do not overlap in the radial direction of the rotor, and the centers of gravity of the coils in each winding layer are evenly distributed on a concentric circle in the circumferential direction of the rotor.

12. The motor of claim 9, wherein the winding comprises an even number of winding layers; and the coils in each winding layer span an even number of teeth.

13. The motor of claim 12, wherein the winding comprises an inner winding layer and an outer winding layer; and the centers of gravity of two adjacent coils in one winding layer and the center of gravity of the coil in the other winding layer nearest said two adjacent coils, define an isosceles triangle.

14. The motor of claim 13, wherein the inner winding layer and the outer winding layer each comprise five coils and each coil spans two teeth, whereby in the same layer the line connecting the centers gravity of each coil forms a regular pentagon shape.

15. The motor of claim 9, wherein the winding comprises an odd number of layers and the coils in each winding layer span an odd number of teeth.

16. The motor of claim 15, wherein the winding comprises an inner winding layer, a middle winding layer and an outer winding layer; and each winding layer comprises four coils, and each coil spans three teeth, whereby the line connecting the centers of gravity of each coil in the same winding layer forms a square.

17. The motor of claim 9, wherein the teeth extend in the radial direction of the rotor, and the slots formed between the teeth accommodate the coils of the winding, wherein the size and shape of each slot is substantially the same, and the size and shape of each tooth is substantially the same.

18. The rotor of claim 1, wherein all coils of the winding are wound by one continuous wire.

19. The motor of claim 9, wherein all coils of the winding are wound by one continuous wire.

* * * * *